United States Patent [19]

Kohzai et al.

[11] 4,307,312
[45] Dec. 22, 1981

[54] DIRECT CURRENT MOTOR HAVING E-SHAPED INTERPOLES

[75] Inventors: Yoshinori Kohzai, Hino; Shigeaki Oyama, Hachioji, both of Japan

[73] Assignee: Fujitsu Fanuc Limited, Tokyo, Japan

[21] Appl. No.: 118,769

[22] Filed: Feb. 5, 1980

[30] Foreign Application Priority Data

Mar. 24, 1979 [JP] Japan .................. 54-33805

[51] Int. Cl.³ .................. H02K 1/10
[52] U.S. Cl. .................. 310/186; 310/181; 310/187; 310/224
[58] Field of Search .......... 310/179, 186, 181–183, 310/187, 188, 224, 46, 225, 177, 226, 154; 322/64–66; 318/525

[56] References Cited

U.S. PATENT DOCUMENTS

| | | | |
|---|---|---|---|
| 2,030,108 | 2/1936 | Hathway | 310/186 |
| 2,530,982 | 11/1950 | Miner | 310/224 |
| 2,679,607 | 5/1954 | Potter | 310/224 |
| 3,274,412 | 9/1966 | Fisher | 310/186 |
| 3,441,760 | 4/1969 | Collens | 310/186 |
| 3,445,702 | 5/1969 | Silva | 310/186 |
| 4,140,935 | 2/1979 | Braun | 310/224 |
| 4,220,882 | 9/1980 | Kohzai | 310/186 |

*Primary Examiner*—R. Skudy
*Attorney, Agent, or Firm*—Armstrong, Nikaido, Marmelstein & Kubovcik

[57] ABSTRACT

A direct current motor used, for example, in a machine tool, comprising an armature, n main magnetic poles disposed around the armature, each of the main magnetic poles consisting of a pole core on which a field winding is provided and a pole piece extending along the outer circumference of the armature, and n/2 E-shaped interpoles disposed at the intermediate position along the outer circumference of the armature between the adjacent main magnetic poles, and at the central axis of the armature, the angle spanning from the direct axis, which is electrically perpendicular to the interpole axis, to an end portion of a pole piece of a main magnetic pole is unequal to that from the direct axis to the other end portion of the pole piece of the main magnetic pole.

Since the number of the E-shaped interpoles is decreased by half, the direct current motor according to the present invention has simple structure and high torque, and the heat generated by the interpoles is relatively decreased.

4 Claims, 4 Drawing Figures

DIRECT CURRENT MOTOR HAVING E-SHAPED INTERPOLES

TECHNICAL FIELD

The present invention relates to a direct current motor having E-shaped interpoles, more particularly to a direct current electric motor having E-shaped interpoles used, for example, in a machine tool.

BACKGROUND OF THE INVENTION

In general, a direct current motor (hereinafter referred to as a DC motor) comprises a plurality of interpoles in order to improve the commutating characteristics of the DC motor. The interpoles are disposed at the intermediate position along the outer circumference of the armature between the adjacent main magnetic poles. The interpoles face the armature windings existing in commutating zones. The interpoles are interlinked by magnetic field produced by the armature reactions, and accordingly the interpoles are necessary to produce a magnetomotive force to eliminate the magnetic field produced by the armature reactions, in addition to a magnetomotive force to produce a magnetic field for commutation.

In order to reduce the magnetomotive force produced by the interpoles and to improve various operating characteristics of the DC motor, a DC motor having E-shaped interpoles has been proposed in U.S. patent application No. 884,586, now U.S. Pat. No. 4,220,882, by the applicant of the present invention. The E-shaped interpoles are disposed at the intermediate position between the adjacent main magnetic poles and attached to the inner circumference of a yoke by using nonmagnetic members. Each of the E-shaped interpoles comprises a center pole having an interpole winding wound thereon, and two legs which are disposed in front and rear of the center pole along the direction of the rotation of the armature, and the end surfaces of the center pole and the two legs face the armature with a small gap therebetween.

With reference to the accompanying FIG. 1, the conventional DC motor having the E-shaped interpoles will be explained in more detail. The conventional DC motor in FIG. 1 comprises an armature 1, a cylindrical shaped yoke 7 and two main magnetic poles 3 and 4 equidistantly spaced around the inner circumference of the yoke 7 and located outside of the armature 1. The main magnetic poles 3 and 4 have field windings 5 and 6 wound thereon, respectively. The field windings 5 and 6 are supplied with electric current in a predetermined direction so that the polarities of the main magnetic poles 3 and 4 are selected to be, for exmple, N and S, respectively. As a result, the armature 1 is counter clockwisely rotated as shown by arrow a. Some of the armature windings 21, 22 and 23, 24, which are located betweem the main magnetic poles 3 and 4, are within commutating zones.

In order to eliminate the counter electromotive force induced in the armature windings 21 through 24 within commutating zones, the E-shaped interpoles 8 and 9 are attached to the inner circumference of the yoke 7 via spacers 25 and 26 made of non-magnetic material, and are located at the intermediate positions along the outer circumference of the armature 1 between the main magnetic poles 3 and 4. The interpole 8 comprises a center pole 81 having an interpole winding 10 wound thereon, the two legs 82 and 83 disposed respectively in front and rear of the center pole 81 along the direction of the rotation of the armature 1. The interpole winding 10 is connected in series with the armature winding 2, and an armature current passes through the interpole winding 10 in such a direction so that the polarity of the center pole 81 becomes S and the polarity of the legs 82 and 83 becomes N. The other interpole 9 also comprises a center pole 91 having an interpole winding 11 wound thereon, and two legs 92 and 93. The interpole winding 11 is connected in series with the armature winding 2, and the direction of the armature current passing through the interpole winding 11 is selected so that the polarity of the center pole 91 becomes N and the polarity of the legs 92 and 93 become S.

The E-shaped interpoles 8 and 9 are hardly affected by the magnetic flux produced by the armature reactions. This is because the magnetic flux caused by the whole of the armature current flowing through the armature winding 2 hardly penetrates the interpoles 8 and 9 due to the existence of the spacers 25 and 26 of non-magnetic material. For example, in the interpole 8, only the magnetic flux $f_1$ and $f_2$, which is caused by the current passing through the armature windings 21 and 22 within a commutating zone, pass through the magnetic circuit including the center pole 81, legs 82 and 83 of the interpole 8 and the armature 1. Thus, the amount of the magnetomotive force produced by the E-shaped interpoles 8 and 9 can be greatly reduced, and therefore, the cross sectional area of the interpole winding can be very small and the heat generated by the interpoles can be reduced.

However, since each of the E-shaped interpoles has two legs in addition to the center pole as mentioned before, the length of the E-shaped interpole, which faces the armature along the outer circumference of the armature is relatively large, and thus the length of the pole pieces 34 and 44 of the main magnetic poles 3 and 4 along the outer circumference of the armature 1 cannot be sufficiently large. In the DC motor illustrated in FIG. 1, an axis A, which passes through the centers of interpoles 8, 9 and the center of rotation 0 of the armature 1, constitutes an interpole axis or a geometrical neutral axis, and an axis B, which is at a 90° electrical angle with the axis A and passes through the center of rotation 0 of the armature 1, constitutes a direct axis. The electrical angle of 90° corresponds to a 90° geometrical angle in a two pole motor, and a 45° geometrical angle in a four pole motor, and so on. The direct axis B in the DC motor of FIG. 1 coincides with a line which passes through the centers of the main magnetic poles and the center of rotation 0 of the armature 1. End portions 31 and 32 of the pole piece 34 of the main magnetic pole 3 are located in a symmetrical position with regard to the direct axis B. Therefore, the angle between the direct axis B and a line which passes through the center of the rotation 0 of the armature 1 and the end portion 31 or 32 is defined as $\alpha$, and thus the length of the pole piece 34 along the outer circumference of the armatuare 1 is directly proportional to an angle $2\alpha$.

In the conventional DC motor illustrated in FIG. 1 having the E-shaped interpoles, the angle $2\alpha$ cannot be sufficiently large because of the presence of the E-shaped interpoles as aforementioned. Therefore, each area of the surfaces of the pole pieces 34, 44 of the main magnetic poles which face the armature 1 cannot be sufficiently large, and the amount of the magnetic flux of the main magnetic poles which passes through the armature 1, and interlinks with the armature winding 2 is limited to a relatively small value so that the torque of the DC motor cannot be sufficiently large.

DISCLOSURE OF THE INVENTION

It is an object of the present invention to provide an improved DC motor which has high torque and simple structure, and which can make effective use of the advantages of the E-shaped interpole, such as a small cross section of the coil portion of the interpole which prevents a rise in temperature in the interpole.

According to the present invention, there is provided a DC motor comprising, an armature rotating around the central axis, n main magnetic poles disposed around said armature, each of said main magnetic poles consisting of a pole core on which a field winding is provided and a pole piece extending along the outer circumference of the armature, and one or more E-shaped interpoles disposed at the intermediate position along the outer circumference of the armature between the adjacent main magnetic poles, characterized in that the number of said E-shaped interpoles is n/2, and, at the central axis of the armature, the angle spanning from the direct axis which is electrically transverse to the interpole axis to an end portion of a pole piece of a main magnetic pole is unequal to that from said direct axis to the other end portion of the pole piece of the main magnetic pole. In the above-mentioned DC motor, the number of the E-shaped interpoles is decreased, and the space obtained by the decrease of the number of the E-shaped interpoles is utilized to enlarge the areas of the end surfaces of the pole pieces of the main magnetic poles which face the armature.

The present invention will be more clearly understood from the following description with reference to the accompanying drawings.

DESCRIPTION OF THE PREFERRED EMBODIMENTS

Figure 1:
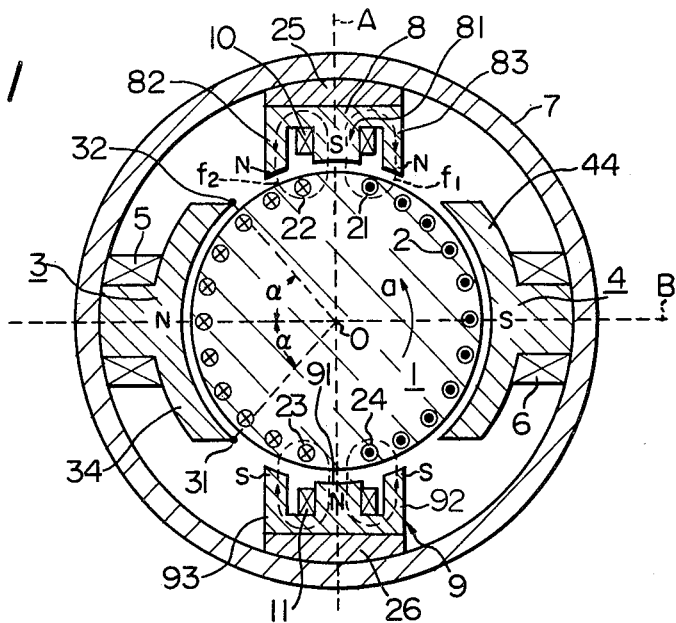
FIG. 1 is a cross sectional view illustrating a conventional two pole direct current motor having two E-shaped interpoles.
Figure 2:
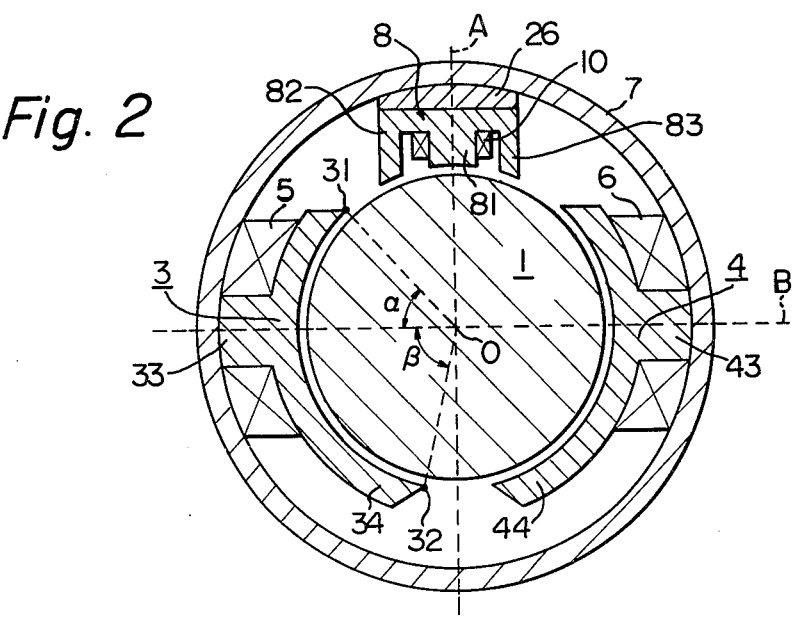
FIG. 2 is a cross sectional view illustrating a two pole direct current motor having an E-shaped interpole as a first embodiment of the present invention.

FIG. 2 illustrates a two pole DC motor of a first embodiment of the present invention which has an E-shaped interpole. In FIG. 2, like items are given the same reference numbers as in FIG. 1. The DC motor illustrated in FIG. 2 comprises a yoke 7, an armature 1, two main magnetic poles 3, 4, and an E-shaped interpole 8. The main magnetic poles 3 and 4 are attached to the inner circumference of the yoke 7, and face the armature 1 with a small gap therebetween. The interpole 8 is disposed at the intermediate position between the main magnetic poles 3 and 4 and attached to the inner circumference of the yoke 7 by using a spacer 26 of non-magnetic material, such as aluminium. The interpole 8 comprises a center pole 81 having an interpole winding 10 wound thereon, and two legs 82 and 83 disposed on both sides of the center pole 81. The main magnetic poles 3 and 4 respectively comprise pole cores 33 and 43 having field windings 5 and 6 wound thereon, and pole pieces (or pole shoes) 34 and 44 extending along the outer circumference of the armature 1. Each pole core 33 and 34 is located in such a position so that the axis of each of the pole cores 33 and 34 coincides with the direct axis B. Each of the pole pieces 34 and 44 has an unsymmetrical shape with regard to the direct axis or first line B. At the center of rotation 0 of the armature 1, the angle $\alpha$ spanning from the direct axis B, which is electrically perpendicular to the interpole axis A, to an end portion 31 of the pole pieces 34 is unequal to the angle $\beta$ spanning from the direct axis B to another end portion 32 of the pole piece 34. In this case, the end portion 31 is located in the nearer position to the E-shaped interpole 8 and the end portion 32 is located in the remotor position to the E-shaped interpole 8. The DC motor illustrated in FIG. 2 has only the one interpole 8 and does not have an interpole corresponding to the interpole 9 in the conventional DC motor illustrated in FIG. 1. Thus, the end portions 31 and 32 are located in unsymmetrical position with respect to the direct axis B, and the angle $\beta$ can be larger than the angle $\alpha$ so that the length of the pole piece 34 along the outer circumference of the armature 1 can be larger. The pole piece 44 is symmetrical in shape with the pole piece 34 with respect to the geometrical neutral axis (interpole axis) A, and the length of the pole piece 44 along the outer circumference of the armature 1 is also larger.

In the DC motor of the first embodiment of the present invention, the length of the interpole 8 along the rotation shaft (not illustrated in the drawing) of the armature 1 is twice the length of the interpoles of the conventional DC motor, in order to achieve, by the one E-shaped interpole, an effect for improving the commutating characteristics corresponding to that of the two E-shaped interpoles in the conventional DC motor illustrated in FIG. 1.

Figure 3:
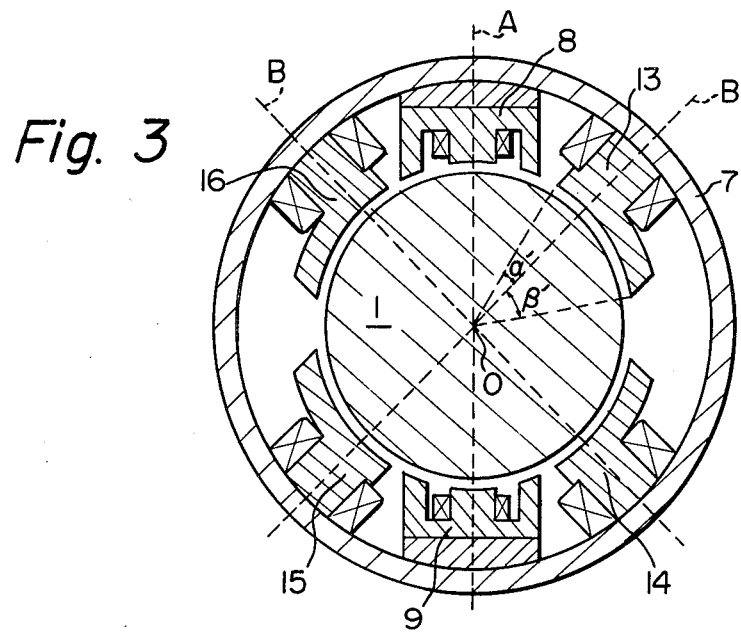
FIG. 3 is a cross sectional view illustrating a four pole direct current motor having two E-shaped interpoles as a second embodiment of the present invention.

FIG. 3 illustrates a four pole DC motor as a second embodiment of the present invention. The DC motor of the second embodiment comprises four main magnetic poles 13 through 16 and two E-shaped interpoles 8 and 9 disposed around the inner circumference of the yoke 7, the E-shaped interpole 8 being located between two adjacent main magnetic poles 13 and 16, and the E-shaped interpole 9 being located between the other two adjacent main magnetic poles 14 and 15. In each main magnetic pole, the angle $\alpha'$ between the direct axis B and the line connecting the center of rotation of the armature and one of the end portions of the pole piece of the main magnetic pole is made unequal to the angle $\beta'$ between the direct axis B and the line connecting the center of rotation 0 and another one of the end portions of the pole piece of the main magnetic pole. That is, the angle $\beta'$ between the direct axis B and the line connecting the center of rotation of the armature 1 and one end portion which is remoter from the adjacent E-shaped interpole is larger than the angle $\alpha'$ between the direct axis B and the line connecting the center of rotation of the armature 1 and another end portion which is nearer to the adjacent E-shaped interpole, so that the area of each of the pole pieces of the main magnetic poles in the four pole DC motor of the present invention is larger than that in the conventional four poles DC motor having four interpoles.

Figure 4:
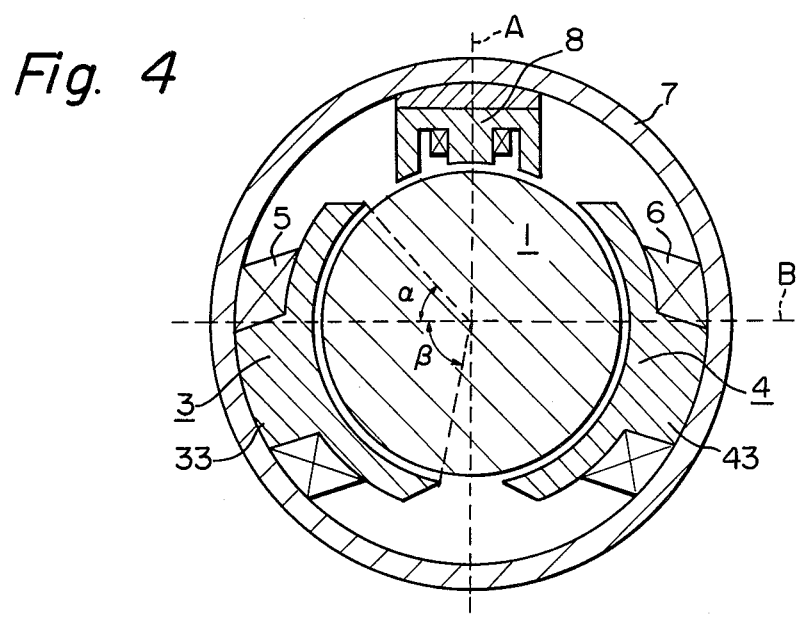
FIG. 4 is a cross sectional view illustrating a two pole direct current motor having an E-shaped interpole as a third embodiment of the present invention.

FIG. 4 illustrates a two pole DC motor having an E-shaped interpole as a third embodiment of the present invention. In the third embodiment, the axes of the pole cores 33 and 43 of the main magnetic poles 3 and 4 are in a rotated position along the inner circumference of the yoke 7 from the direct axis B to a direction remoter from the E-shaped interpole 8, so that the winding spaces of the field windings 5 and 6 are enlarged.

According to the present invention, the angle between the direct axis and the line connecting one of the end portions of the pole piece of the main pole and the center of rotation of the armature is unequal to the angle between the direct axis and the line connecting another one of the end portions and the center of rotation of the armature, and the length of each of the pole pieces of the main magnetic poles can be elongated, and each area of the pole pieces which face the armature can be enlarged. Therefore, the magnetic flux of the main poles which penetrate the armature can be increased and the torque of the DC motor can be enlarged. In the DC motor according to the present invention, the number of the interpoles is decreased by half. Thus, the DC motor according to the present invention has a simple structure and is less expensive. Also, in the DC motor according to the present invention, the number of coil ends of the interpole windings is decreased by half, and the length of the coil end is almost as large as the effective length (length of coil side) of the interpole winding. Accordingly, heat generated by the whole interpole winding is relatively decreased.

When the pole cores are displaced from the direct axis as mentioned above, the winding spaces of the field coils are increased, and an increase in the size of the DC motor can be prevented. Consequently, a DC motor of small size, high performance and low cost can be provided.

What is claimed is:

1. A direct current motor comprising an armature rotatable about a central axis thereof, and field means positioned around said armature, said field means including n main magnetic poles each having a core member and a first field winding wound on said core member, said main magnetic poles being spaced from one another around the outer circumference of said armature and at least one interpole having an E-shaped core member and a second field winding wound thereon, said at least one interpole being positioned around the outer circumference of said armature between adjacent main magnetic poles wherein the number of said interpoles is n/2 and wherein an angle $\beta$, formed between a first line which is electrically perpendicular to the axis of said at least one interpole and passes through the said central axis and a second line which passes through one end of the end surface said core members facing said armature and said central axis, is unequal to an angle $\alpha$, formed between said first line and a third line which passes through the other end of said end surface of said core members and said central axis.

2. A direct current motor as set forth in claim 1 wherein said one end of said core members is positioned a greater distance from an adjacent E-shaped core member than said other end, and wherein said angle $\beta$ is greater than said angle $\alpha$.

3. A direct current motor as set forth in claims 1 or 2 wherein the axis of said pole members coincides with said first line.

4. A direct current motor as set forth in claims 1 or 2 wherein the axis of said pole members does not coincide with said first line.

* * * * *